United States Patent
Sugi et al.

(10) Patent No.: US 7,299,150 B1
(45) Date of Patent: Nov. 20, 2007

(54) ULTRASONIC FLOW METER

(75) Inventors: Tokio Sugi, Tokyo (JP); Tadao Sasaki, Kanagawa (JP)

(73) Assignee: Tokyo Keiso Co., Ltd., Tokyo (JP)

( * ) Notice: Subject to any disclaimer, the term of this patent is extended or adjusted under 35 U.S.C. 154(b) by 0 days.

(21) Appl. No.: 11/591,854

(22) Filed: Nov. 2, 2006

(30) Foreign Application Priority Data

Apr. 28, 2006 (JP) ............................. 2006-125491

(51) Int. Cl.
*G06F 19/00* (2006.01)
(52) U.S. Cl. ....................................... 702/159; 324/222
(58) Field of Classification Search ................ 702/159, 702/182–185, 45–49, 79; 324/222, 306
See application file for complete search history.

(56) References Cited

U.S. PATENT DOCUMENTS 7,069,793 B2 * 7/2006 Ishikawa et al. ......... 73/861.18

FOREIGN PATENT DOCUMENTS

| JP | 2002-162269 A | 6/2002 |
|----|---------------|--------|
| JP | 2002-243514 A | 8/2002 |

* cited by examiner

*Primary Examiner*—Edward Raymond
(74) *Attorney, Agent, or Firm*—Frishauf, Holtz, Goodman & Chick, P.C.

(57) ABSTRACT

In an ultrasonic flow meter for measuring a flow rate of a fluid flowing through a conduit by detecting a propagating time difference between a forward propagating time of an ultrasonic wave propagating within the conduit in a forward direction and a backward propagating time of an ultrasonic wave propagating within the conduit in a backward direction, forward and backward ultrasonic wave signals generated by ultrasonic vibrating elements are sampled to derive forward and backward digital data series x and y, which are stored in a memory, the forward and backward digital data series x and y are read out of the first and second memory units and total sums of absolute difference values between the forward and backward digital data series x and y are calculated, while data positions of these backward and forward digital data series x and y are relatively shifted, a shift amount of data positions at which a total sum of absolute difference values becomes minimum is detected, an ultrasonic propagating time difference is derived in accordance with the detected shift amount of data positions, a flow speed of the fluid within the conduit is derived from the ultrasonic wave propagating time difference, and a flow rate of the fluid flowing through the conduit is derived in accordance with the flow speed and a known cross sectional area of the conduit.

8 Claims, 8 Drawing Sheets

ULTRASONIC FLOW METER

BACKGROUND OF THE INVENTION

1. Field of the Invention

The present invention relates to an ultrasonic flow meter for measuring a flow rate of a fluid flowing through a conduit with ultrasonic waves.

2. Related Art Statements

In known ultrasonic flow meters for measuring a flow rate of a fluid flowing through a conduit, an ultrasonic pulse is transmitted from an upstream position toward a downstream position within the conduit to detect a forward transit time of the ultrasonic pulse and an ultrasonic pulse is transmitted from a downstream position toward an upstream position within the conduit to detect a backward transit time of the ultrasoninc pulse, then a difference between the forward transit time and the backward transit time is detected to derive a transit time difference, and finally a flow rate of the fluid is measured from the thus detected transit time difference of ultrasonic pulse.

In a Japanese Patent Application Publication Kokai No. 2002-162269, there is disclosed a known ultrasonic flow meter, in which said transit time difference of ultrasonic pulse is detected using zero cross points. In a Japanese Patent Application publication Kokai No. 2002-243514, there is disclosed another known ultrasonic flow meter, in which said transit time difference of ultrasonic pulse is detected using cross-correlation of ultrasonic wave signals.

Figure 12:
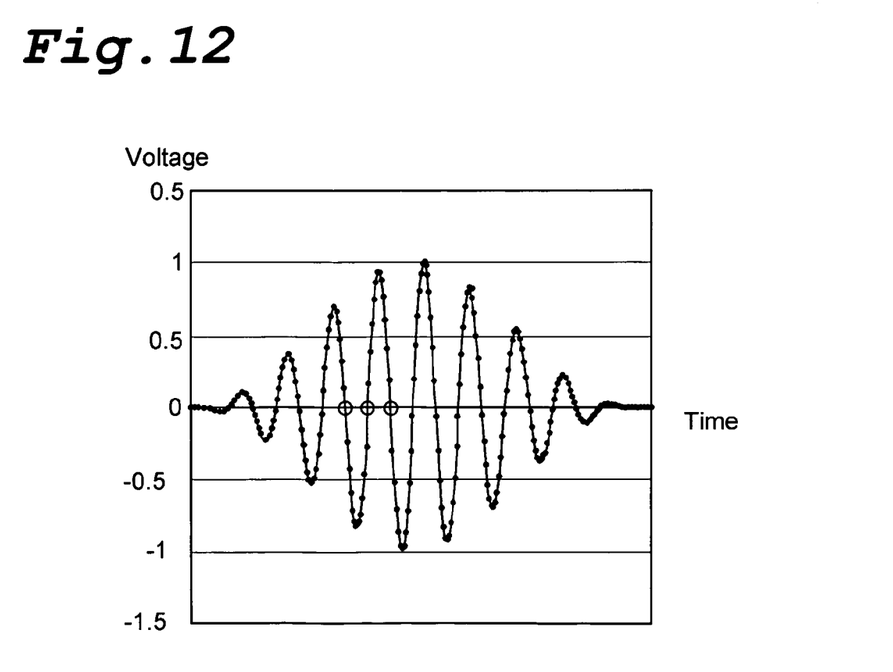
FIG. 12 is a graph showing a known zero cross point method.

In the known ultrasonic flow meters, even when a single ultrasonic pulse is transmitted, ultrasonic receiving unit receives an ultrasonic wave over plural cycles as illustrated in FIG. 12 due to a self resonance of an ultrasonic vibrating unit. Therefore, the received ultrasonic wave contains a plurality of zero cross points. In the known ultrasonic flow meter using the zero cross point method, it is necessary to find corresponding zero cross points in the received ultrasonic wave of forwardly transmitted ultrasonic pulse and in the received ultrasonic wave of backwardly transmitted ultrasonic pulse.

However, if a signal-to-noise ratio of the received ultrasonic waves is decreased due to a descendant of signal level or if there is a rather large difference in amplitude between the received ultrasonic waves, the corresponding zero cross points might not be detected correctly. If the corresponding zero cross points could not be detected correctly, there might be introduced a large error in the measurement of flow rate.

Figure 13:
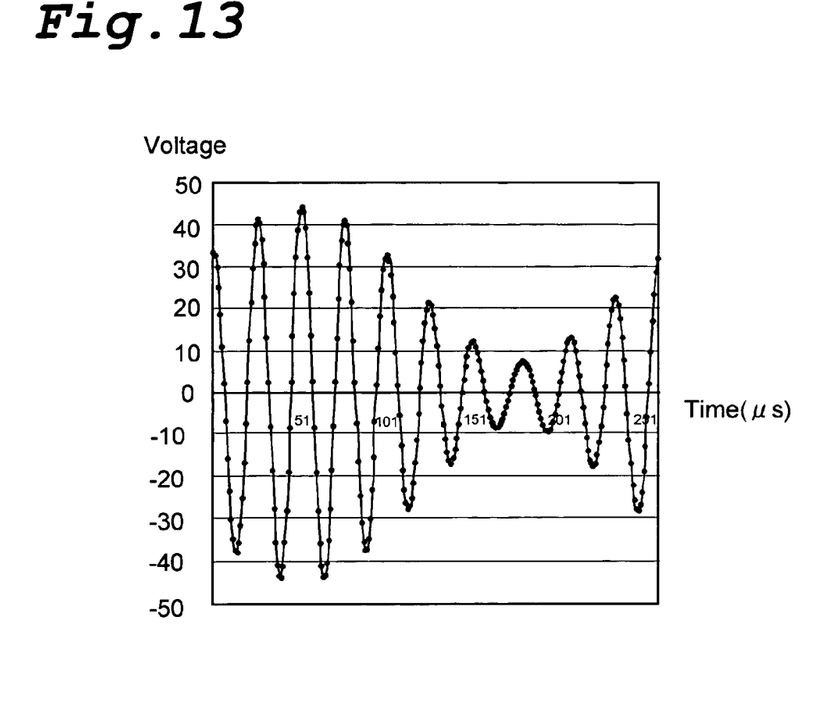
FIG. 13 is a graph representing a received ultrasonic wave in the known cross-correlation method.
Figure 14:
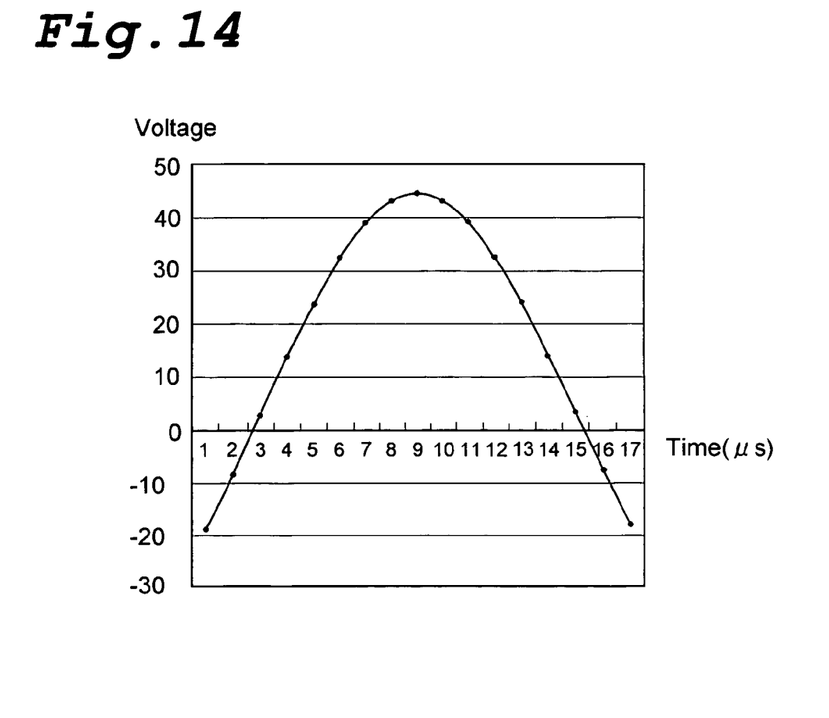
FIG. 14 is a graph illustrating a peak portion on an enlarged scale.

In the known ultrasonic flow meter using the cross-correlation method, a received ultrasonic wave signal is treated statistically to derive a point at which a maximum cross-correlation is obtained as a measure denoting a transit time difference. A cross-correlation curve does not show a sharp curvature, and therefore in order to detect a maximum point accurately, it is necessary to approximate the cross-correlation curve by a polynomial expression such as a quadratic equation. FIG. 13 shows an example of such a calculation result using a cross-correlation and FIG. 14 shows a graph illustrating a peak position on an enlarged scale.

In the known ultrasonic flow meter using the cross-correlation method, a received ultrasonic wave signal of the forwardly transmitted ultrasonic pulse is sampled to derive a digital data series x composed of N sample values and a received ultrasonic wave signal of the backwardly transmitted ultrasonic pulse is also sampled to derive a digital data series y composed of N sample values. A cross-correlation between these two digital data series x and y is derived by the following equation (1).

$$Rxy[m]=\Sigma x[n] \cdot y[n+m] \quad (m=0, 1, 2, ---, N-1) \quad (1)$$

In this equation (1), Rxy denotes a cross-correlation, $x[n]$, $y[n+m]$ represent the data series x and y and $\Sigma$ means an integration with $n=1, 2, --- N$.

An amount of shift m at which the cross-correlation Rxy becomes maximum denotes a transit time difference between the forwardly and backwardly propagating ultrasonic waves. In order to detect such a shift amount m, a large amount of multiplications has to be calculated in accordance with the equation (1). When this calculation is carried out by software, it needs a long time period and when the calculation is conducted by hardware, it is necessary to use an expensive signal processing unit having a high performance.

A shift amount m at which the calculated cross-correlation Rxy becomes maximum is an integer, but a true maximum value of the cross-correlation is usually obtained at a middle point between m and m−1 or m+1. Therefore, in order to detect a true maximum value, the cross-correlation curve has to be approximated by a polynomial expression such as a quadratic equation as explained above.

SUMMARY OF THE INVENTION

The present invention has for its object to provide a novel and useful ultrasonic flow meter which can remove the above mentioned drawbacks of the known ultrasonic flow meters and the transit time difference between the forwardly propagating ultrasonic wave and the backwardly propagating ultrasonic wave can be detected accurately by a simple calculation within a short time period.

According to the invention, an ultrasonic flow meter for measuring a flow rate of a fluid flowing through a conduit by detecting a transit time difference between a forward propagating time of an ultrasonic wave propagating within the conduit in a forward direction from an upstream side to a downstream side and a backward propagating time of an ultrasonic wave propagating within the conduit in a backward direction from a downstream side to an upstream side comprises:

a first ultrasonic vibrating unit provided on an upstream side of the conduit for transmitting an ultrasonic wave propagating in the forward direction and receiving an ultrasonic wave propagating in the backward direction to generate a backward ultrasonic wave signal;

a second ultrasonic vibrating unit provided on a downstream side of the conduit for transmitting an ultrasonic wave propagating in the backward direction and receiving the ultrasonic wave transmitted from said first ultrasonic vibrating unit and propagating in the forward direction to generate a forward ultrasonic wave signal;

an A/D converter for sampling and converting said backward and forward ultrasonic wave signals generated from said first and second ultrasonic vibrating units, respectively into backward and forward digital data series x and y, respectively;

first and second memory units for storing said backward and forward digital data series x and y, respectively;

a control unit for reading said backward and forward digital data series x and y out of said first and second memory units, respectively, while data positions of these backward and forward digital data series x and y are relatively shifted; and a calculating unit for deriving total sums of absolute difference values between the backward and forward digital data series x and y read out of said first and second memory units, and for detecting a shift amount of data positions at which a total sum of absolute difference values becomes minimum, wherein an ultrasonic propagating time difference is derived in accordance with the thus detected shift amount of data positions, a flow speed of the fluid within the conduit is derived from the thus derived ultrasonic wave propagating time difference, and a flow rate of the fluid flowing through the conduit is derived in accordance with the thus derived flow speed and a known cross sectional area of the conduit.

In the ultrasonic flow meter according to the invention, it is possible to derive accurately a transit time difference of ultrasonic waves by a simple calculation within a short time period. Therefore, the number of measurements within a unit time period can be increased as compared with the known ultrasonic flow meters, and thus if the number of measurements is equal to that of the known ultrasonic flow meters, the calculation can be carried out by a less expensive low speed signal processing unit.

DESCRIPTION OF THE PREFERRED EMBODIMENTS

Figure 1:
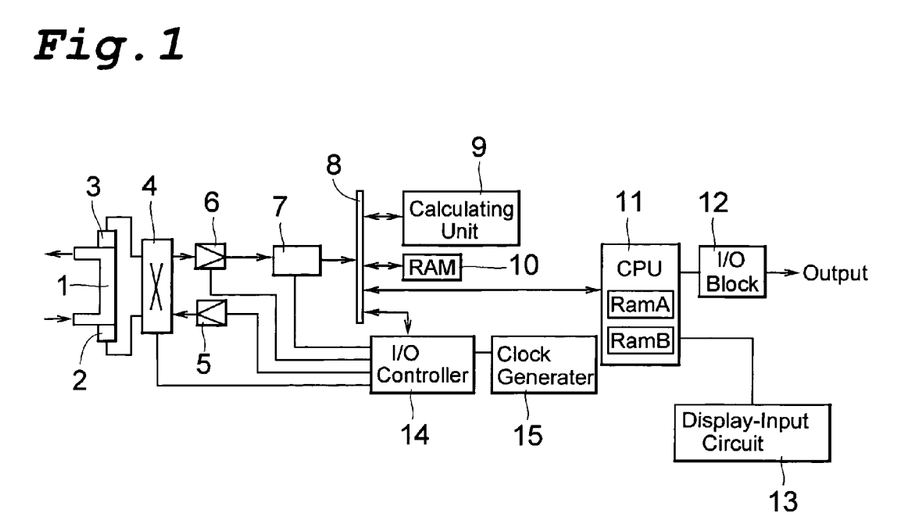
FIG. 1 is a block diagram showing a block diagram of an embodiment of the ultrasonic flow meter according to the invention.

FIG. 1 is a block diagram showing an embodiment of the ultrasonic flow meter according to the invention. A fluid whose flow rate is to be measured flows through a conduit 1. At upstream and downstream positions of the conduit 1, there are provided ultrasonic vibrating elements 2 and 3, respectively. It should be noted that the ultrasonic element 2 serves to transmit an ultrasonic wave as well as to receive an ultrasonic wave transmitted from the ultrasonic vibrating element 3, and similarly the ultrasonic vibrating element 3 functions to transmit an ultrasonic wave as well as to receive an ultrasonic wave transmitted from the ultrasonic vibrating element 2.

The ultrasonic vibrating elements 2 and 3 are connected to a transmitting amplifier 5 and a receiving variable gain amplifier 6 selectively via a switch or multiplexer 4. An output of the receiving variable gain amplifier 6 is connected to a calculating unit 9, a RAM 10 and a CPU 11 via an A/D converter 7 and a data bus 8. To the CPU 11 are also connected an I/O block 12 and a display-input circuit 13.

Furthermore, an I/O controller 14 is connected to the data bus 8, and a clock generator 15 is connected to the I/O controller 14. Outputs of the I/O controller 14 are connected to the switch 4, transmitting amplifier 5, receiving variable gain amplifier 6 and A/D converter 7.

Upon measuring a flow rate of the fluid flowing through the conduit 1, the various circuits are controlled by suitable program commands stored in the CPU 11. The upstream ultrasonic vibrating element 2 is driven to transmit an ultrasonic wave toward the downstream ultrasonic vibrating element 3 and the ultrasonic wave transmitted through the flowing fluid is received by the downstream ultrasonic vibrating element 3, and then the downstream ultrasonic vibrating element 3 is driven to generate an ultrasonic wave toward the upstream ultrasonic vibrating element 2 and the ultrasonic wave thus transmitted through the fluid is received by the upstream ultrasonic vibrating element 2. A flow rate of the fluid flowing through the conduit 1 is derived by suitably processing the received ultrasonic waves. It should be noted that the downstream ultrasonic vibrating element 3 may be first driven and then the upstream ultrasonic vibrating element 2 may be driven.

At first, the switch 4 is driven such that the output of the transmitting amplifier 5 is connected to the upstream ultrasonic vibrating element 2 and the input of the receiving variable gain amplifier 6 is connected to the downstream ultrasonic vibrating element 3. Then, the I/O controller 14 generates a burst signal for energizing the ultrasonic vibrating element. After amplifying the burst signal by the transmitting amplifier 5, the amplified burst signal is applied to the upstream ultrasonic vibrating element 2.

The upstream ultrasonic vibrating element 2 is energized by the burst signal and an ultrasonic wave is transmitted through the fluid flowing through the conduit 1 toward the downstream ultrasonic vibrating element 3. When the downstream ultrasonic vibrating element 3 receives the ultrasonic wave, it produces an ultrasonic wave signal, i.e. a pulse signal and the thus produced pulse signal is amplified by the receiving variable gain amplifier 6. Then, the thus amplified pulse signal is converted into a digital data series x by the A/D converter 7. The digital data series x is stored in the RAM 10. A level of the pulse signal generated by the downstream ultrasonic vibrating element 3 might be varied due to various causes, and therefore the receiving variable gain amplifier 6 functions to compensate such a variation such that the amplified pulse signal has a suitable level within a given range.

Next, the switch 4 is exchanged such that the input of the receiving variable gain amplifier 8 is connected to the upstream ultrasonic vibrating element 2 and the output of the transmitting amplifier 5 is connected to the downstream ultrasonic vibrating element 3. Then, the downstream ultrasonic vibrating element 3 is driven by a burst signal to transmit an ultrasonic wave. The ultrasonic wave transmitted through the fluid flowing through the conduit 1 are received the upstream ultrasonic vibrating element 2 to generate an ultrasonic wave signal, i.e. a pulse signal. The pulse signal is treated in a same manner as explained above to generate a digital data series y and the thus generated digital data series y is stored in the RAM 10.

The CPU 11 comprises two random access memories RamA and RamB which store the digital data series x and y, respectively. These memories RamA and RamB operate independently each other and digital data can be read out of the memories RamA and RamB simultaneously to the calculating unit 9.

The display-input circuit 13 functions to display a result and to set various parameters such as a range of a flow rate, upper and lower alarm limits of flow rate, zero adjustment and correction of linearity. I/O block 12 serves to output a flow rate and an alarm signal. The I/O block 12 includes a serial communication faculty.

Figure 2:
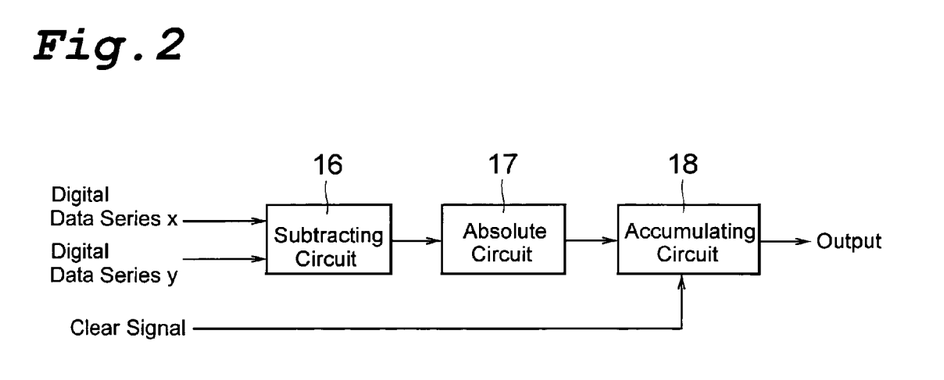
FIG. 2 is a block diagram illustrating a calculating unit.

FIG. 2 is a circuit diagram showing an embodiment of the calculating unit 9 constructed by hardware. The digital data series x and y obtained by processing the ultrasonic wave signals generated by the ultrasonic vibrating elements 2 and 3 are supplied to a subtracting circuit 16, an output of the subtracting circuit 16 is connected to an absolute circuit 17 and absolute values generated by the absolute circuit 17 are accumulated by an accumulating circuit 18. A clear signal is also supplied to the accumulating circuit 18 at suitable timings.

In the calculating unit 9, a difference Sxy[m] between the two digital data series x and y is calculated in accordance with the following equation (2), wherein $\Sigma$ denotes an integration for n=1, 2, - - - , N and m=0, 1, 2, - - - , N−1.

$$Sxy[m]=\Sigma|x[n]-y[n+m]| \quad (2)$$

In the known ultrasonic flow meter using the cross-correlation method, the cross-correlation Rxy is calculated in accordance with multiplication as shown by the equation (1). Contrary to this, in the novel ultrasonic flow meter according to the invention, the difference Sxy is calculated in accordance with absolute values of differences between the two digital data series x and y as expressed by the equation (2). As compared with the known multiplication method, the subtraction method according to the invention can be performed within a shorter time period by much simpler hardware or software. Therefore, the calculation under the equation (2) can be carried out much faster than the calculation under the equation (1).

Now it is assumed that each of the two digital data series x and y is composed of 512 data values and differences between these data values are calculated by the subtracting circuit 16. Then, there are obtained 512 difference values, absolute values of these 512 difference values are derived by the absolute circuit 17, and these absolute vales are accumulated in the accumulating circuit 18 to derive a total sum of absolute difference values. The above mentioned calculation is carried out by 512 times, while data positions of the two digital data series x and y are relatively shifted to obtain a complete set of total sums of the absolute difference values.

In the present embodiment, the calculating unit 9 generates a total sum of absolute difference values each time data positions are shifted. The data position shift can be simply performed by software in accordance with a program of the CPU 11. By detecting an amount of data position shift at which the difference between the two digital data series x and y becomes minimum in the manner mentioned above, it is possible to obtain a transit time difference of the ultrasonic waves, and then a flow speed of the fluid within the conduit 1 can be derived. Finally, a flow rate of the fluid within the conduit 1 can be calculated from the thus derived flow speed and a known cross sectional area of the conduit 1.

In the present embodiment, the transit time difference of ultrasonic wave is calculated by hardware, i.e. the calculating unit 9, but according to the invention, the transit time difference may be derived by software. By using the hardware, the calculation can be performed at a higher speed.

The calculated result obtained by the calculating unit 9 in accordance with the equation (2) is further processed by the CPU 11 to derive a true minimum value of the difference. The flow speed of the fluid within the conduit 1 is calculated on the basis of this true minimum value, and the flow rate is calculated on the basis of the thus obtained flow speed. The derived flow rate is supplied to the display-input circuit 13 via the I/O block 12. In this manner, the detected flow rate is displayed on the display-input circuit 13. If desired, an alarm may be produced by the display-input circuit 13 when the detected flow rate is out of a predetermined acceptable range.

As shown in the equation (2), when each of the two digital data series x and y is composed of N data values, in order to derive a complete set of difference values, the subtraction has to be conducted by N×N times. However, in practice, it is not always necessary to carry out the subtraction by N×N times. Now it is assumed that a distance between the ultrasonic vibrating elements 2 and 3 is 10 cm, a propagating speed of the ultrasonic wave within the fluid is 1500 m/s and an estimated maximum flow speed is 10 m/s, a transit time of ultrasonic wave from the upstream ultrasonic vibrating element 2 to the downstream ultrasonic vibrating element 3 is 0.1/(1500+10) and a transit time of ultrasonic wave from the downstream ultrasonic vibrating element 3 to the upstream ultrasonic vibrating element 2 is 0.1/(1500−10). Then, a transit time difference will amount to about 0.9 µs.

Now it is further assumed that the digital data series x and y are obtained by performing the sampling at a sampling frequency of 50 MHz. Then, the above mentioned maximum transit time difference will correspond to 45 sampling periods. In other words, the two digital data series x and y do not shift each other over 45 sampling periods. Therefore, the difference Sxy expressed by the equation (2) can be obtained by performing the calculation for m=0-45. In practice, values of m may be set to a little wider range such as 0-60.

Figure 3:
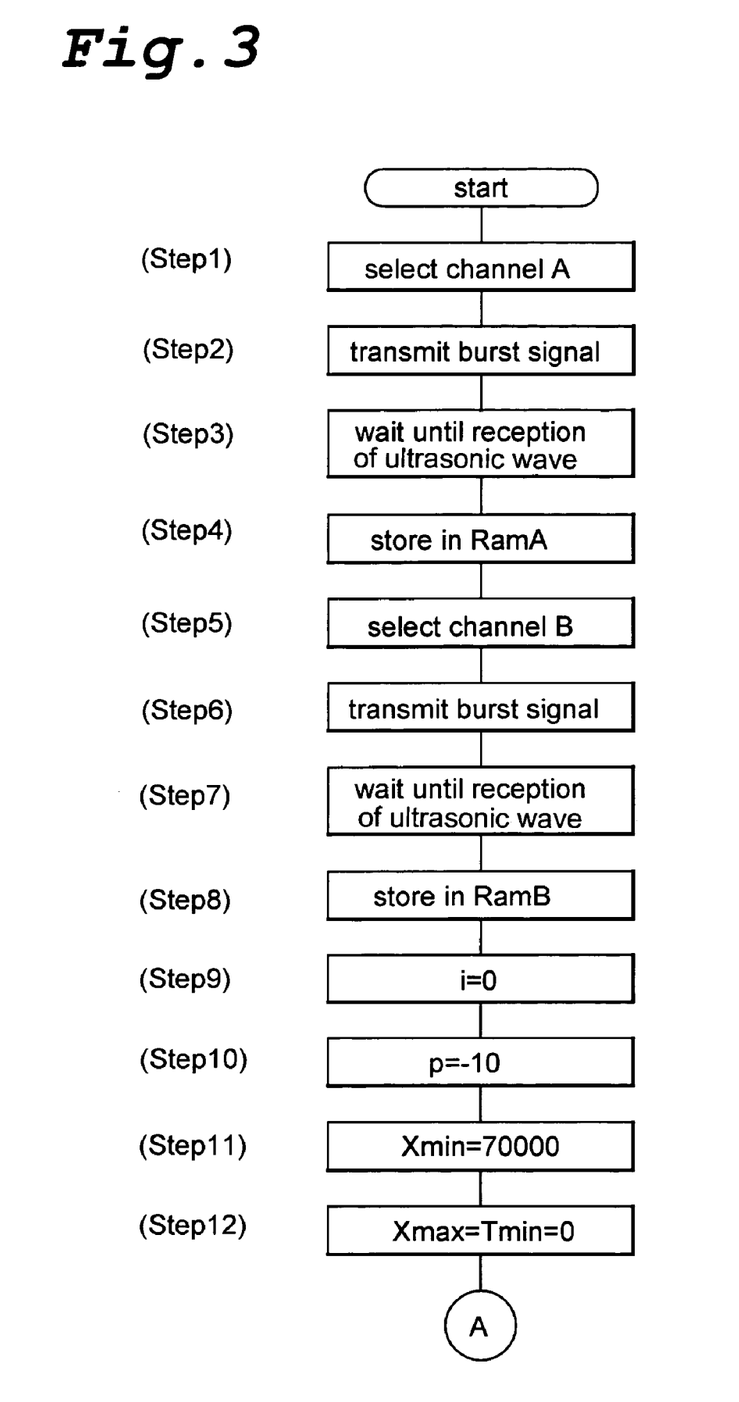
FIG. 3 is a flow chart representing a part of successive steps for deriving a transit time difference.
Figure 4:
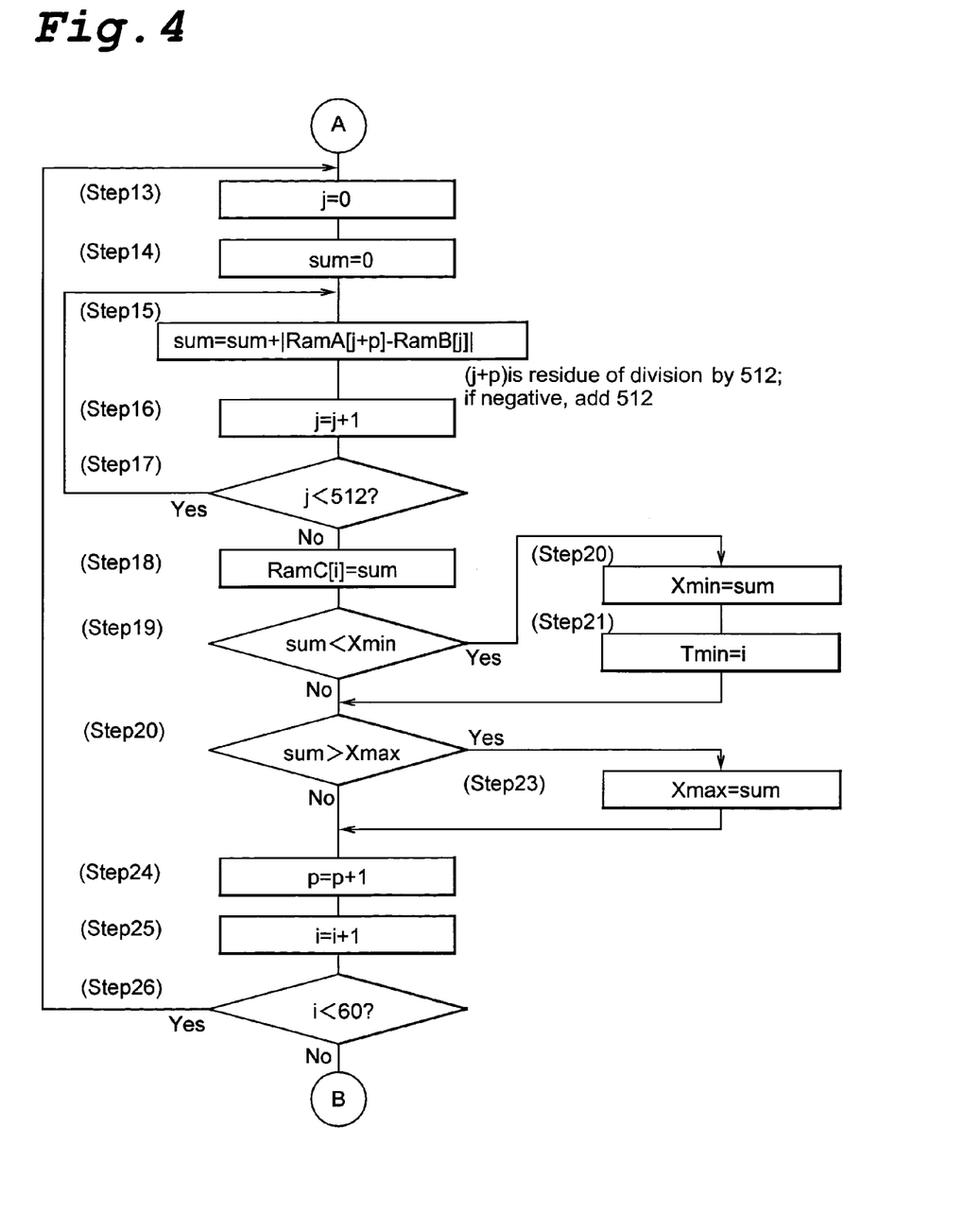
FIG. 4 is a flow chart representing a part of successive steps for deriving a transit time difference.
Figure 5:
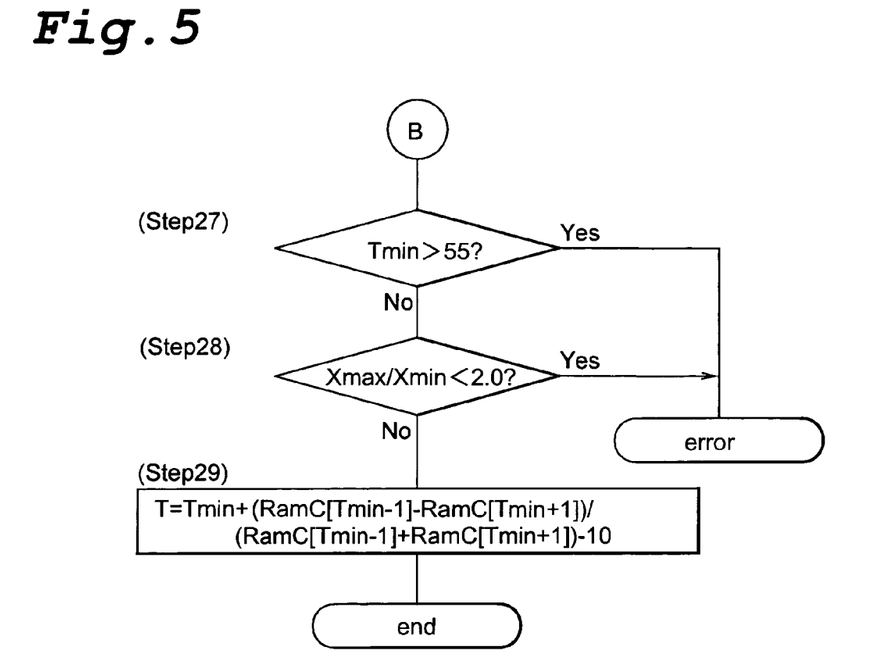
FIG. 5 is a flow chart representing a remaining part of successive steps for deriving a transit time difference.

Now successive steps for carrying out the measurement by the ultrasonic flow meter according to the invention will be explained in detail with reference to flow charts shown in FIGS. 3, 4 and 5.

Step 1: A channel A (ultrasonic wave propagates from upstream to downstream) is selected by means of the switch 4.

Step 2: A burst signal is applied to the upstream ultrasonic vibrating element 2 from the transmitting amplifier 5.

Step 3: Wait until the ultrasonic wave transmitted from the upstream ultrasonic vibrating element 2 arrives at the downstream ultrasonic vibrating element 3.

Step 4: The ultrasonic wave signal generated from the downstream ultrasonic vibrating element 3 is sampled at a sampling rate of 50 MHz and is supplied to the A/D converter 7 via the receiving variable gain amplifier 6 and 512 data values are stored in RamA in the RAM 10.

Step 5: A channel B (ultrasonic wave propagates from downstream to upstream) is selected by means of the switch 4.

Step 6: A burst signal is applied to the downstream ultrasonic vibrating element 3 from the transmitting amplifier 5.

Step 7: Wait until the ultrasonic wave transmitted from the downstream ultrasonic vibrating element 3 arrives at the downstream ultrasonic vibrating element 3.

Step 8: The ultrasonic wave signal generated from the upstream ultrasonic vibrating element 2 is sampled at the sampling rate of 50 MHz and is supplied to the A/D converter 7 via the receiving variable gain amplifier 6 and 512 data values are stored in RamB in the RAM 10.

Step 9: A variable i of a first loop counter is set to 0.

Step 10: A variable p representing an amount of shift of data positions upon calculating the absolute value differences is set to −10. If a flow speed of the fluid is zero, a shift amount of data positions at which a total sum of absolute difference values becomes minimum is zero. Then, data near the shift amount could not be obtained. Since in the present embodiment, a true minimum value of a total sum of absolute difference values is estimated, the fact that data near the shift amount could not be obtained might result in that a true minimum value according to the equation (2) could not be estimated. Therefore, in the present embodiment, an initial value of the variable p is set to −10.

Step 11: A variable Xmin is set to, for instance 70000. This variable is to memorize a minimum value of a total sum of absolute difference values and should be set to a value as large as possible.

Step 12: A variable Tmin and a variable Xmax are set to 0. The variable Tmin is used to memorize a shift amount at which a total sum of absolute difference values becomes minimum and the variable Xmax is used to memorize a maximum total sum of absolute difference values.

Step 13: A variable j of a second loop counter is set to 0.

Step 14: A variable sum for accumulating a total sum of absolute difference values is initially set to 0.

Step 15: Data values of the digital data series x and y are successively read out of the RamA and RamB into the calculating unit 9. Differences of the data values are derived by the subtracting circuit 16, absolute values of the differences are derived by the absolute circuit 17 and the absolute values of differences are accumulated by the accumulating circuit 18 to derive a total sum of absolute difference values. This total sum is the variable sum. Here, if a range of j is 0-511 and, further, j+p becomes negative under the condition that the initial value of p is set to −10, therefore 512 is added to that value such that an index i for referring a table storing the variable sum becomes positive.

Step 16: The variable j of the second loop counter is incremented by 1 (j=j+1).

Step 17: If the variable j of the second loop counter is not larger than 512, the Step 15 and Step 16 are repeated. If the count value j of the second loop counter becomes 512, the process proceeds to Step 18.

Step 18: The variable sum obtained by the above process is stored in RamC[i]. RamC may be provided in the RAM 10 or in the CPU 11.

Step 19: If the variable sum is smaller than the variable Xmin, the process proceeds to Step 20 and Step 21. If the variable sum is equal to or larger than Xmin, Step 22 is carried out.

Step 20: The variable Xmin is replaced by the variable sum.

Step 21: The variable Tmin is replaced by i.

Step 22: If the variable sum obtained by the calculation is larger than the variable Xmax, Step 23 is carried out, but if not, Step 24 is performed.

Step 23: The variable Xmax is replaced by the variable sum.

Step 24: The variable p is incremented by one (p=p+1).

Step 25: The variable i is incremented by one

Step 26: If the variable i is smaller than 60, the process from the Step 13 is repeated. If not, Step 27 is performed.

Step 27: If the variable Tmin is larger than a predetermined value, e.g. 55, the measurement is finished in error.

Step 28: If a ratio of the variable Xmax to the variable Xmin is smaller than a predetermined value, e.g. 2.0, the measurement is finished in error.

Step 29: A true minimum value T of the difference is calculated by the CPU 11 in accordance with a content in the RamC and the value of the variable Tmin. In this Step 29, the true minimum value T is derived by subtracting 10 from the true minimum value T. This is due to the fact that the value of p is initially set to −10.

Figure 6:
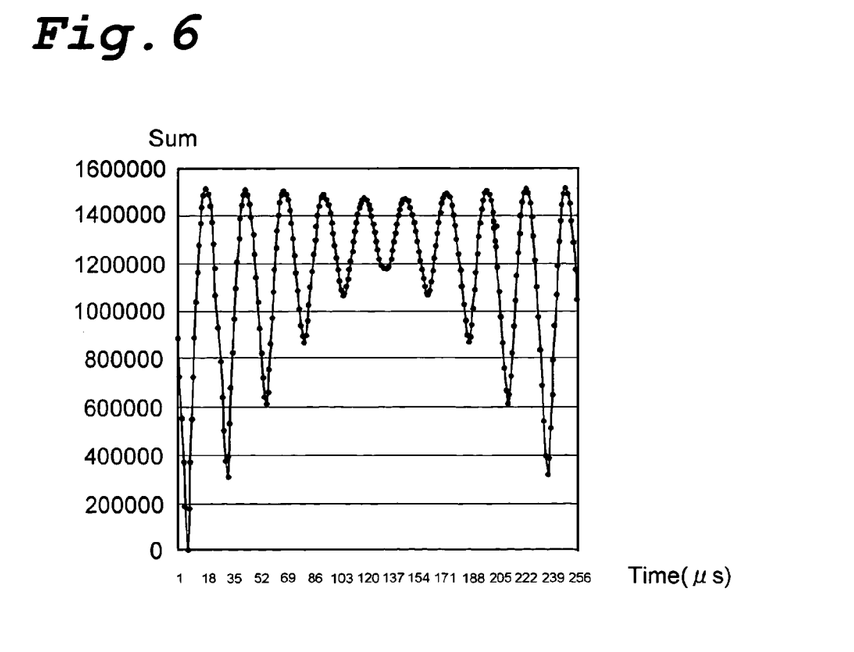
FIG. 6 is a graph showing a calculated result of a cross-correlation.
Figure 7:
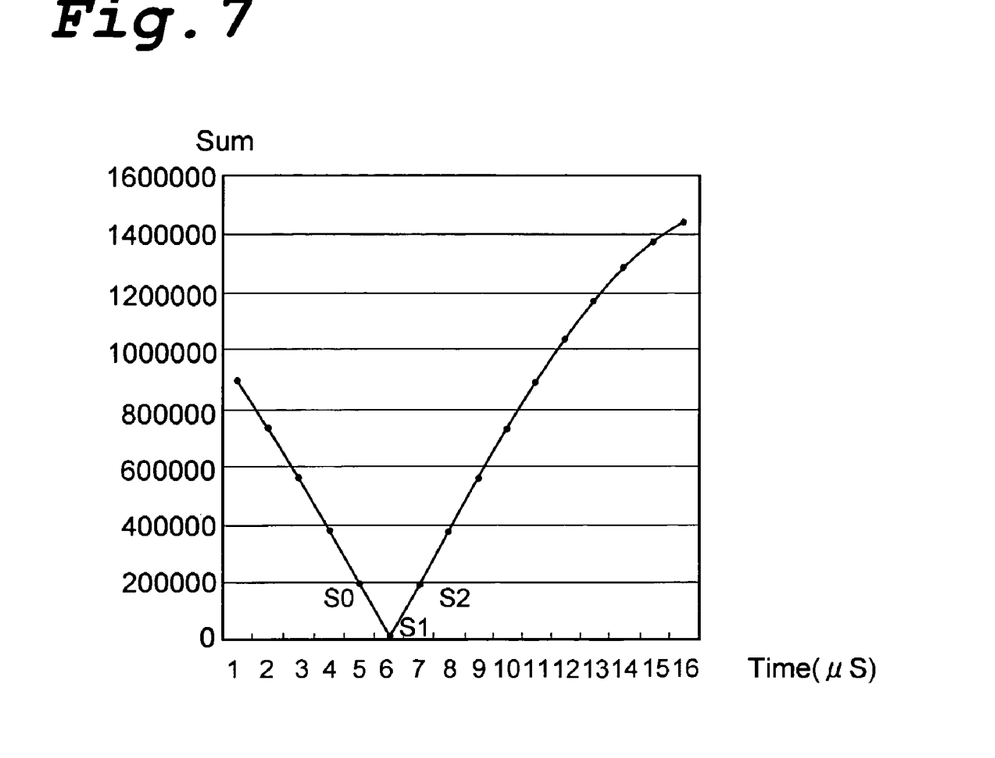
FIG. 7 is a graph representing a portion including a data point at which the calculated cross-correlation shows a minimum value with an enlarged scale.

FIG. 6 is a graph showing an example of the calculation result, and FIG. 7 is an enlarged graph showing a portion near the calculated minimum value. In the cross-correlation obtained by the equation (1), a point of the maximum value denotes a minimum value of the transit time difference. In the difference method shown by the equation (2), a point of the minimum value denotes the minimum value of the transit time difference. That is to say, in FIG. 6, a position of a descending peak on left hand side denotes the minimum value of the transit time difference. It should be noted that a point of a true minimum value may be a point shifted from the position of the descending peak. The point of the true minimum value is derived by estimation in accordance with values at adjacent points as expressed in the Step 29.

Figure 8:
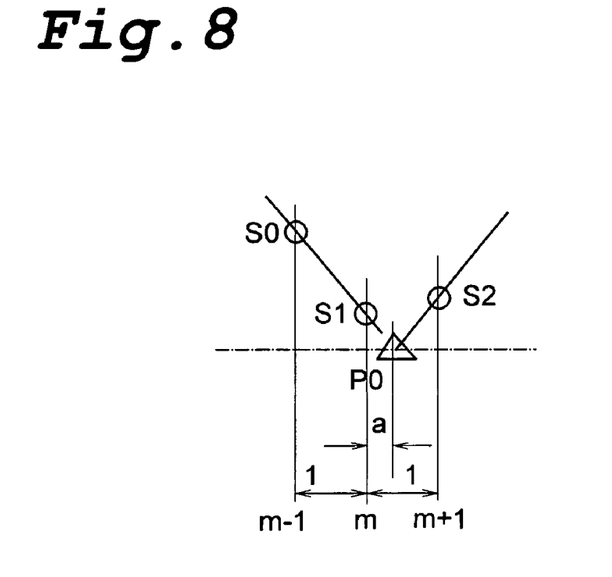
FIG. 8 is an explanatory diagram depicting a manner of detecting a true minimum value of cross-correlation.

In FIG. 8, S1 denotes a calculated minimum value obtained at a point m, and S0 and S2 are calculated values at positions shifted from the point m by −1 and +1, respectively. P0 may be positioned at a point where a total sum of absolute difference is assumed to be minimum and to be shifted from S1 by a distance a which is a fraction of shift amount (0<a<1). It should be noted that the true minimum value P0 of a total sum of absolute difference values is very small and could be approximated as zero, and furthermore an absolute value of an inclination of a line connecting the points S0, S1 and P0 is identical with an absolute value of an inclination of a line connecting the points S2 and P0. Then, the fraction of shift amount a may be estimated by the following equation (3).

$$S0/(1+a) = S2/(1-a) \tag{3}$$

From the fraction of shift amount a calculated from the equation (3), a time position T at which the estimated minimum value is obtained may be derived in accordance with the following equation (4).

$$T = m + a = m + (S0 - S2)/(S0 + S2) \tag{4}$$

From this equation (4), it is apparent that the time position T at which the true minimum value is obtained can be derived by a single division, and therefore the process time can be shortened.

The true minimum value position may be derived by using S0 and S1 or S1 and S2 instead of S0 and S2. If S0 is larger than S2, the true minimum value position may be derived by extrapolation using S0 and S1 or by interpolation using S1 and S2. If S0 is smaller than S2, the true minimum value position may be estimated by interpolation using S0 and S1 or by extrapolation using S1 and S2.

In the manner explained above, the true minimum value position T, i.e. a true transit time difference can be obtained. Each time the ultrasonic pulse wave is transmitted, a flow rate of the fluid within the conduit can be measured. The measurement of flow rate can be performed by several ten times per a unit second.

In the ultrasonic flow meter, when a flow rate of a liquid is to be measured, the ultrasonic wave might be degraded during the transmission through the liquid due to air bubbles or solid particles contained in the liquid. Then, a quality of the ultrasonic wave signal generated by the ultrasonic vibrating element might be bad. This might cause an error in the measurement of flow rate. Therefore, it is important to evaluate a quality of the ultrasonic wave signal.

Figure 9:
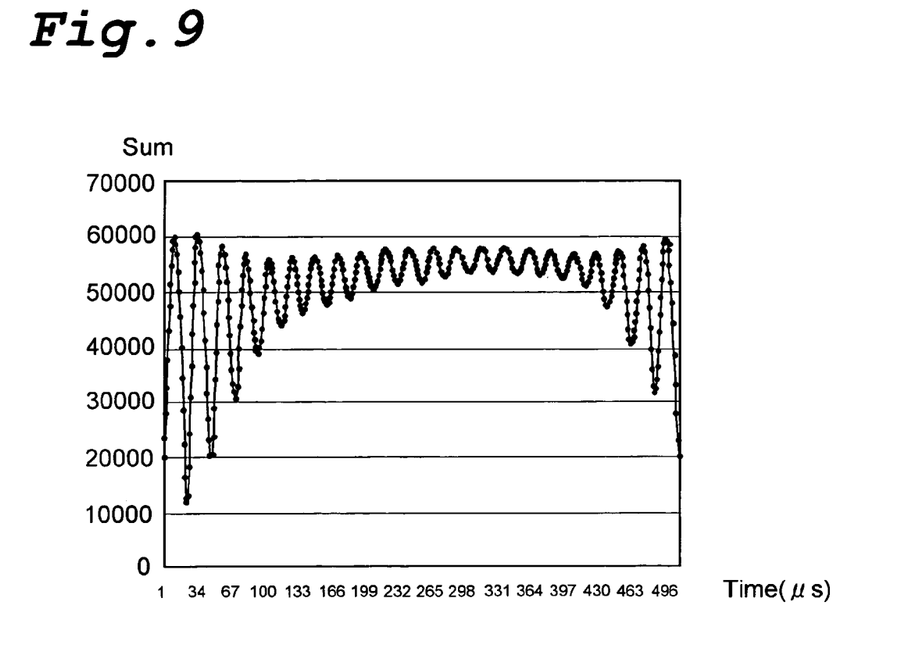
FIG. 9 is a graph showing an ultrasonic wave signal having a good quality.
Figure 10:
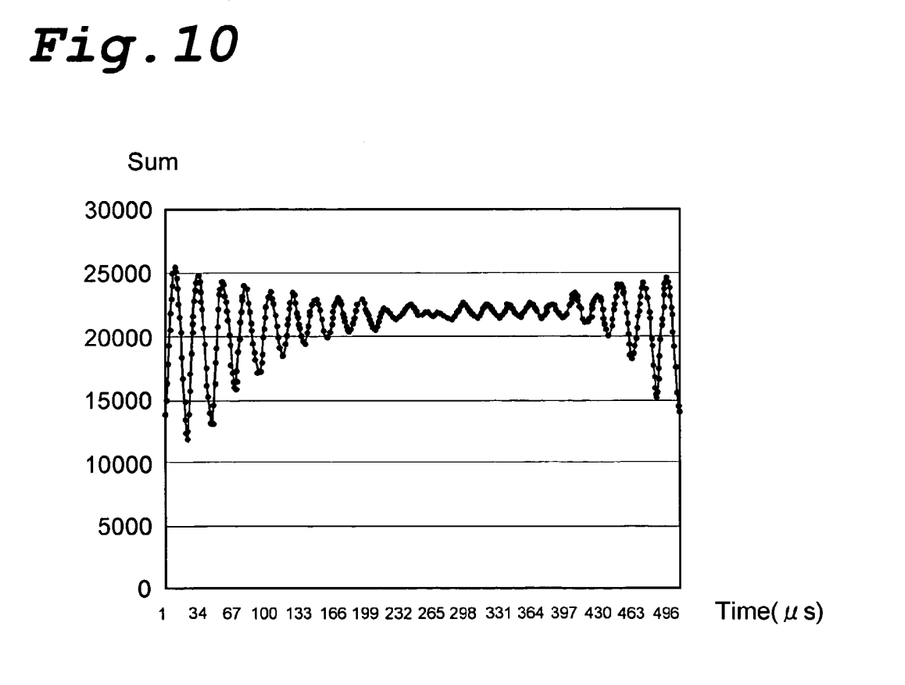
FIG. 10 is a graph illustrating an ultrasonic wave signal having a bad quality.

FIG. 9 is a graph showing an example of result of difference calculated from the ultrasonic wave signal having a high quality, and FIG. 10 is a graph when a quality of the ultrasonic wave signal is deteriorated. FIG. 12 is a similar graph when the ultrasonic wave signal is further deteriorated. It should be noted that in FIGS. 9, 10 and 11, a flow speed of the fluid is identical.

As can be seen from these graphs, a sharpness of maximum values of the difference is decreased, and therefore if a ratio of the maximum value to the minimum value exceeds a predetermined threshold level or a ratio of the maximum value to the minimum value is decreased beyond a predetermined threshold level, it is judged that a quality of the ultrasonic wave signal is deteriorated too much to measure a flow speed correctly. In the present embodiment, a ratio of the maximum value to the minimum value is compared with the threshold level of 2.0 as expressed in the Step 28 shown in FIG. 5 and the measurement is finished as an error. In this case, an alarm may be produced.

Figure 11:
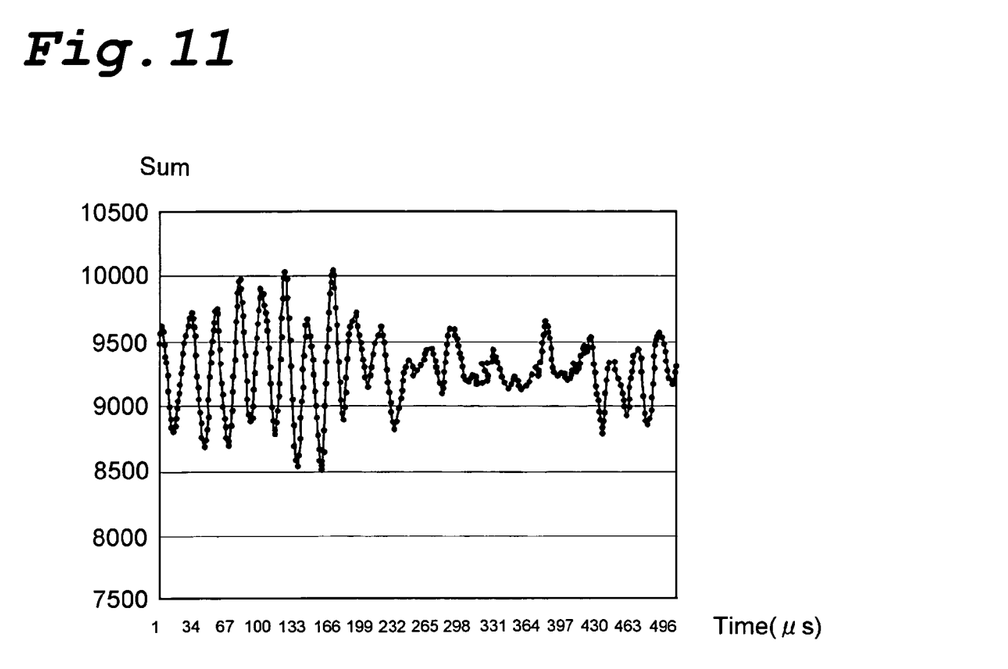
FIG. 11 is a graph depicting an ultrasonic wave signal having a worse quality.

In the graphs shown in FIGS. 9 and 10, a position at which the minimum value is obtained is near 24, but in the graph illustrated in FIG. 11, the minimum value position is 166 which is largely deviated from the minimum value position of 24. In the present embodiment, as shown in the Step 27, the variable Tmin is compared with a predetermined threshold value of 55, and if Tmin is larger than 55, the measurement is finished as an error. In this manner, it is possible to exclude error data and the measurement of flow rate of the fluid can be performed accurately.

The present invention is not limited only to the above mentioned embodiment, but many modifications and alternations may be conceived by a person skilled in the art within the scope of the invention. For instance, in the above embodiment, a true minimum value of a total sum of absolute difference values between the two digital data series is estimated, but according to the invention, it is not always perform such estimation. Then, the memory for storing the total sums of absolute difference values for respective shift positions of data may be dispensed with. However, it is desirable to provide such memories and a true minimum value is estimated from one or more actually calculated total sums near the true minimum value.

The invention claimed is:

1. An ultrasonic flow meter for measuring a flow rate of a fluid flowing through a conduit by detecting a transit time difference between a forward propagating time of an ultrasonic wave propagating within the conduit in a forward direction from an upstream side to a downstream side and a backward propagating time of an ultrasonic wave propagating within the conduit in a backward direction from a downstream side to an upstream side comprising:
   a first ultrasonic vibrating unit provided on an upstream side of the conduit for transmitting an ultrasonic wave propagating in the forward direction and receiving an ultrasonic wave propagating in the backward direction to generate a backward ultrasonic wave signal;
   a second ultrasonic vibrating unit provided on a downstream side of the conduit for transmitting an ultrasonic wave propagating in the backward direction and receiving the ultrasonic wave transmitted from said first ultrasonic vibrating unit and propagating in the forward direction to generate a forward ultrasonic wave signal;
   an A/D converter for sampling and converting said backward and forward ultrasonic wave signals generated from said first and second ultrasonic vibrating units, respectively into backward and forward digital data series x and y, respectively;
   first and second memory units for storing said backward and forward digital data series x and y, respectively;
   a control unit for reading said backward and forward digital data series x and y out of said first and second memory units, respectively, while data positions of these backward and forward digital data series x and y are relatively shifted; and
   a calculating unit for deriving total sums of absolute difference values between the backward and forward digital data series x and y read out of said first and second memory units, and for detecting a shift amount of data positions at which a total sum of absolute difference values becomes minimum, wherein an ultrasonic propagating time difference is derived in accordance with the thus detected shift amount of data positions, a flow speed of the fluid within the conduit is derived from the thus derived ultrasonic wave propagating time difference, and a flow rate of the fluid flowing through the conduit is derived in accordance with the thus derived flow speed and a known cross sectional area of the conduit.

2. The ultrasonic flow meter according to claim 1, wherein said calculating unit comprises memories each storing respective total sums of absolute difference values for respective shift amounts of data position.

3. The ultrasonic flow meter according to claim 1, wherein said central processing unit is constructed such that a true shift amount of data positions at which a total sum of absolute difference values becomes minimum is estimated by interpolation using the minimum calculated total sum of absolute difference values and at least one calculated total sum of absolute difference values with a shift amount of data positions which is decremented or incremented by a unit shift amount with respect to said shift amount of data positions at which the calculated minimum total sum of absolute difference values is obtained.

4. The ultrasonic flow meter according to claim 1, wherein said calculating unit is constructed such that a maximum total sum of difference values is detected in addition to said minimum total sum of absolute difference values, a ratio of the maximum total sum of absolute difference values to the minimum total sum of absolute difference values is derived, and said ratio is compared with a predetermined threshold value to judge that if the ratio exceeds the predetermined threshold value, the measurement is finished in error.

5. The ultrasonic flow meter according to claim 1, wherein said calculating unit is constructed such that said shift amount of data positions at which the minimum total sum of absolute difference values is obtained is compared with a predetermined threshold value, and if said shift amount of data positions at which the minimum total sum of absolute difference values is obtained exceeds said predetermined threshold value, the measurement is finished in error.

6. The ultrasonic flow meter according to claim 2, wherein said central processing unit is constructed such that a true shift amount of data positions at which a total sum of absolute difference values becomes minimum is estimated by interpolation using the minimum calculated total sum of absolute difference values and at least one calculated total sum of absolute difference values with a shift amount of data positions which is decremented or incremented by a unit shift amount with respect to said shift amount of data positions at which the calculated minimum total sum of absolute difference values is obtained.

7. The ultrasonic flow meter according to claim 2, wherein said calculating unit is constructed such that a maximum total sum of difference values is detected in addition to said minimum total sum of absolute difference values, a ratio of the maximum total sum of absolute difference values to the minimum total sum of absolute difference values is derived, and said ratio is compared with a predetermined threshold value to judge that if the ratio exceeds the predetermined threshold value, the measurement is finished in error.

8. The ultrasonic flow meter according to claim 2, wherein said calculating unit is constructed such that said shift amount of data positions at which the minimum total sum of absolute difference values is obtained is compared with a predetermined threshold value, and if said shift amount of data positions at which the minimum total sum of absolute difference values is obtained exceeds said predetermined threshold value, the measurement is finished in error.

* * * * *